Dec. 27, 1927.  H. E. ATKINSON  1,653,833
CONNECTER FOR BATTERY TERMINALS AND OTHER ELECTRICAL CONDUCTORS
Filed Sept. 17, 1925
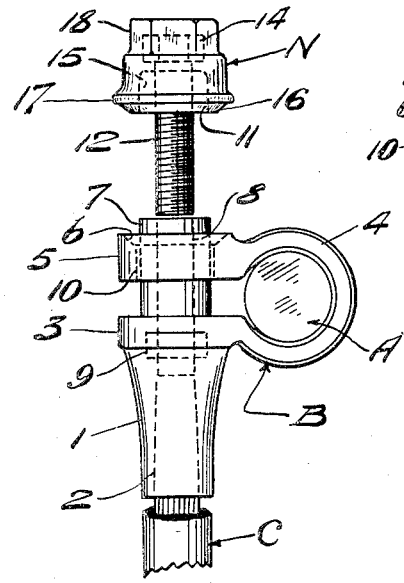
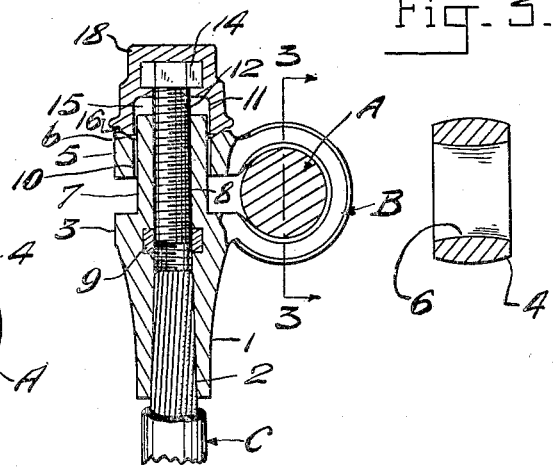
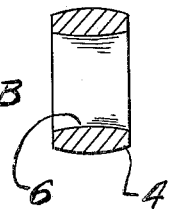
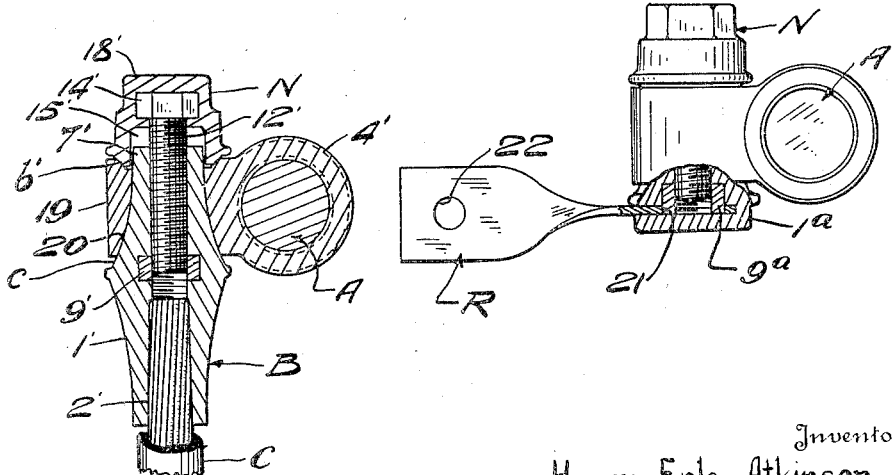
Inventor
Happy Erle Atkinson
By Watson E. Coleman
Attorney Patented Dec. 27, 1927.

1,653,833

UNITED STATES PATENT OFFICE.

HARRY ERLE ATKINSON, OF TRAVERSE CITY, MICHIGAN.

CONNECTER FOR BATTERY TERMINALS AND OTHER ELECTRICAL CONDUCTORS.

Application filed September 17, 1925. Serial No. 57,010.

This invention relates to connecters for battery terminals and other electrical conductors and it is an object of the invention to provide a device of this kind comprising two terminals constructed in a manner whereby, when in assembled relation, they effect an acid non-sulphating or non-corroding connection.

It is also an object of the invention to provide a device of this kind wherein the terminals of the connection are maintained in assembled relation by a head serving as a grease cup whereby the grease, when the head is applied, assures a positive tight seal and at the same time maintains the various movable parts retracted in a manner to facilitate the attaching and detaching of the terminals of the connection.

An important object of the invention is to construct a connection using metal or metals, such as lead and some of its alloys that do not sulphate or corrode, and wherein the connection is so constructed that when it is connected to a storage battery there are no metal parts exposed to the acid effects of the battery.

An additional object of the invention is to provide a connection of this kind for connecting a cable to a storage battery or any other form or place where a non-sulphating connection is required, said connection being of a character wherein it will not sulphate or corrode from acids and the chemical action of the storage battery.

The invention consists in the details of construction and in the combination and arrangement of the several parts of my improved connecter for battery terminals and other electrical conductors whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in elevation of a terminal connecter constructed in accordance with an embodiment of my invention, a part being in separated relation;

Figure 2 is a view partly in longitudinal section and partly in elevation of the structure as illustrated in Figure 1 with all of the parts assembled;

Figure 3 is a sectional view taken substantially on the line 3—3 of Figure 2 with the post omitted;

Figure 4 is a view partly in section and partly in elevation illustrating a further embodiment of my invention;

Figure 5 is a view partly in elevation and partly in section illustrating a still further embodiment of my invention.

In the embodiment of my invention as illustrated in Figure 1, my improved connecter comprises a battery post or terminal A and a conductor or cable terminal B. The battery post or terminal A comprises a conventional tapered type.

The terminal B as herein disclosed comprises a member 1 provided in one end portion with a socket 2 extending substantially the entire length thereof and in which is adapted to be engaged an end portion of a cable C, said end portion of the cable being molded within the member 1, soldered therein, or otherwise effectively affixed. It is also to be noted that this member 1 is tapered toward its outer end to permit, if desired, an effective application of an extra insulator. Welded, soldered or otherwise affixed to the outer end of the member 1 is a head 3 extending outwardly from an end of a split collar 4, the opposite end being also provided with a head 5 overlying the head 3.

The inner wall of the collar 4 is oppositely beveled or chamfered, as at 6, to facilitate its engagement with the post or terminal A and permitting the terminal B to be readily used right or left as may be required for negative or positive. The heads 3 and 5 are slightly spaced one from the other so that upon pressing the head 5 toward the head 3, the collar 4 may be contracted to assure an effective clamping action on the post or terminal A.

Extending outwardly from the axial center of the head 3 is a plug 7 having disposed axially therethrough a bore 8 also extended through the head 3 and within the adjacent or outer end portion of the member 1. This bore 8 is also continued through a lead coated hard metal nut 9 interposed between the member 1 and the head 3 and embedded therein.

The plug 7 is of a length to extend through and slightly beyond the head 5, the opening 10 in said head 5 being of a diameter slightly in excess of the diameter of the plug 7. The outer portion b of said opening 10 is disposed on an outward bevel providing an annular channel surrounding the outer end portion of the plug 7. Coacting with the plug 7 and the head 3 is a head or nut N, the inner face of which being provided with a relatively large recess or pocket 11 from the axial center of which extends a threaded shank or bolt 12 of hard metal coated with lead or made of lead combined with metals to give it requisite hardness. The head 14 of the bolt 12 is cast into the head or nut N when the same is molded and the shank or bolt 12 is of a length to project a considerable distance beyond the inner end of the head or nut N for threaded engagement within the bore 8 hereinbefore referred to and thereby permitting the head or nut N to have requisite contact with the head 5 to effect the requisite contraction of the collar 4 upon the post or terminal A.

The pocket 11 is of a diameter materially greater than that of the shank or bolt 12 thereby providing an annular chamber 15 adapted to be filled with a suitable lubricating grease preferably vaseline and thereby permitting the head or nut N to operate as a grease cup. The outer or open end of the pocket 11 is defined by an outstanding lip 16 the outer or peripheral wall of which being disposed on a bevel complemental to the bevel of the portion b of the opening in the head 5.

In practice, as the shank or bolt 12 of the head or nut N is screwed into the bore 8 to properly engage the collar 4 with the post or terminal A, the outstanding peripheral flange 17 carried by the inner end of said head or nut will press against the periphery or opposed outer face of the head 5 and the lip 16 will snugly engage within the portion b of the opening in said head 5 thereby providing an effective double closure between the head or nut N and said head 5. During the application of the head or nut N, the lubricant within the pocket 11 will squeeze out around the plug 7 and fill the space between the periphery of said plug and the wall of the opening 10, thus effectively lubricating all of the movable parts and making a firm grease pack between the plug 7 and the head or nut N and around the shank or bolt 12. By this pack the labor of applying or removing the terminal B is materially facilitated.

After the head or nut N has once been applied, it will not be necessary to again entirely remove the same as the length of the shank or bolt 12 is such to permit the head or nut N to be retracted with respect to the plug 7 a distance sufficient to allow the pocket 11 to be refilled with grease, which should be done each time the terminal B is clamped to the terminal A.

The nut 9 hereinbefore referred to is employed to provide what may be termed a super-strong tap, threaded to withstand excessive strain in the event the head or nut N should have excessive pressure imposed thereon. It is also preferred that the position of this nut 9 with respect to the open end of the bore 8 of the plug 7 be such that when the flange 17 of the head or nut N presses against the adjacent face of the head 5, the outer end of the shank or bolt 12 has just entered or is about to enter the nut 9.

The outer end of the head or nut N is provided with a polygonal extension 18 with which a wrench or other suitable implement is conveniently engaged to properly rotate the head or nut N.

The embodiment of my invention as illustrated in Figure 4 is substantially the same as that hereinbefore described except that the collar 4' is adapted to be welded, soldered or otherwise affixed to the post or terminal A' and is integrally formed with a collar or sleeve 19, the bores of said collar 4' and the sleeve 19 being angularly related. The bore 20 of the collar 19 has its lower portion tapered to correspond with the lower tapered portion c of the post 7' and with the outer portion of the bore 20 provided with the enlarged bevel portion b'.

In Figure 5, I illustrate a still further embodiment of my invention wherein a metal ribbon or strap R is employed in lieu of a cable. An end portion of this strap R is molded in the outer portion of the member 1ª, the inserted end portion of the strap being provided with an opening 21 snugly fitting around the nut 9ª. The outer end portion of the strap or ribbon R is also provided with an opening 22 whereby suitable connection may be had therewith.

From the foregoing description it is thought to be obvious that a connecter for battery terminals and other electrical conductors constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A connecter terminal comprising, in combination, a member adapted for connection with a conductor, an outstanding tubular plug carried by said member, a connecter having an opening through which the plug extends, a head provided with a pocket in its inner end, a threaded shank carried by said head and positioned axially of the pocket, said shank being of a length to extend beyond the inner end of the head and adapted to have threaded engagement within the bore of the plug, said pocket being of a diameter greater than the shank to provide a grease cup, said head having contact with the applied connecter, said plug being of a length to extend through the opening in the connecter and beyond the outer face thereof.

2. A connecter terminal comprising, in combination, a member adapted for connection with a conductor, an outstanding tubular plug carried by said member, a connecter having an opening through which the plug extends, a head provided with a pocket in its inner end, a threaded shank carried by said head and positioned axially of the pocket, said shank being of a length to extend beyond the inner end of the head and adapted to have threaded engagement within the bore of the plug, said pocket being of a diameter greater than the shank to provide a grease cup, said head having contact with the applied connecter, the outer portion of the opening in the connecter being enlarged, the inner face of the head being provided with a lip for contact with the wall of such enlarged portion.

3. A connecter terminal comprising, in combination, a member adapted for connection with a conductor, an outstanding tubular plug carried by said member, a connecter having an opening through which the plug extends, a head provided with a pocket in its inner end, a threaded shank carried by said head and positioned axially of the pocket, said shank being of a length to extend beyond the inner end of the head and adapted to have threaded engagement within the bore of the plug, said pocket being of a diameter greater than the shank to provide a grease cup, said head having contact with the applied connecter, the outer portion of the opening in the connecter being enlarged, the inner face of the head being provided with a lip for contact with the wall of such enlarged portion, said head having an outstanding peripheral flange for contact with the connecter outwardly of said enlarged portion.

In testimony whereof I hereunto affix my signature.

HARRY ERLE ATKINSON.